Dec. 13, 1949 G. W. HARDY 2,491,375
PROPELLER MECHANISM AND CONTROL
Filed March 28, 1944 5 Sheets-Sheet 1

FIG.-1

Inventor
GORDON W. HARDY
By George M. Soule
Attorney

Dec. 13, 1949 G. W. HARDY 2,491,375
PROPELLER MECHANISM AND CONTROL
Filed March 28, 1944 5 Sheets-Sheet 3

INVENTOR.
GORDON W HARDY
BY
George M Soule
ATTORNEY

Patented Dec. 13, 1949

2,491,375

UNITED STATES PATENT OFFICE 2,491,375

PROPELLER MECHANISM AND CONTROL

Gordon W. Hardy, Euclid, Ohio, assignor to The Marquette Metal Products Company, Cleveland, Ohio, a corporation of Ohio Application March 28, 1944, Serial No. 528,412

3 Claims. (Cl. 170—160.31)

This invention relates to a controllable pitch propeller mechanism and to a control system for adjusting the pitch of the blade or blades while the craft served by the mechanism is in motion. The objects include provision of an improved mechanism and control of that character and particularly:

1. A new arrangement for enabling blade pitch adjustment through the intermediary of hydraulic fluid without introducing any of the sealing problems such as are usually encountered as a result of having to supply fluid to and removing it from a rotating assembly during flight.

2. A hydraulically operated remotely controllable variable pitch propeller mechanism having a self-contained hydraulic system requiring no sealing against fluid leakage between relatively rotating surfaces.

3. A variable pitch propeller in which the blades are adjusted through the intermediary of hydraulic fluid in a hermetically sealed system all parts of which, including the entire fluid supply, rotate with the propeller.

4. A variable pitch hydraulically acting propeller which will operate, if required, with hydraulic fluids which have no lubricating value and/or which remain liquid at extremely low temperatures.

5. An adjustable pitch propeller mechanism in which the blades are accurately, hydrostatically locked in the desired adjusted positions at all times.

6. A hydraulically acting variable pitch propeller mechanism having means to enable variation in speed of blade pitch adjustment in one direction relative to the speed of adjustment in the opposite direction, as in order to enable rapid blade movement toward reverse pitch while still maintaining very gradual blade movement toward high pitch.

7. An arrangement for positive and accurate propeller blade control for effecting any pitch variation that could be desired and wherein the rotated weight is reduced substantially to a minimum and balanced.

8. A hydraulically acting variable pitch propeller having an improved means for adjustably limiting the kinetic force applicable to effect blade adjustment.

9. An improved hydraulic variable pitch propeller mechanism wherein the tendency of the blades to return toward low pitch position is obstructed by an adjustable automatically operating limiting means enabling return movement only after the force causing such tendency reaches a predetermined or set value.

10. A variable pitch propeller capable of multi-range blade adjustment; wherein the rotated parts are of light weight; wherein the center of gravity is relatively close to the outer main bearing support of the driving shaft; and which propeller can easily be fitted to the different types or styles of aircraft engine crank shafts now in use without requiring material alteration of the propeller mechanism or crankshaft.

11. An improved variable pitch propeller control for aircraft which control is operable to effect all desired pitch variations at the will of the operator or pilot of the craft and by one hand in substantially the usual position on the control column of the craft.

12. An aircraft control column with finger tip control operable to effect blade pitch variations while in flight.

13. A variable pitch propeller mechanism wherein blade adjustment and the control for the adjusting means are operated respectively by independent hydraulic systems.

14. An improved fluid pumping and valving system for a hydraulically acting variable pitch propeller mechanism.

15. An improved pumping system for hydraulic fluid in a hydraulically acting variable pitch propeller wherein a fluid displacing or pumping element operates in a closed sump or supply chamber rotatable with the propeller and so related to the displacing element as always to supply only substantially non-compressible or hydraulic fluid thereto.

16. An improved blade mounting for a variable pitch propeller.

17. An improved mounting mechanism for a blade of a variable pitch propeller whereby the blade is arranged to be turned for initial adjustment with reference to a pitch adjusting part and finally prevented from turning.

18. An improved manner of connecting a propeller blade shank to an associated rotary element adapted to effect pitch adjustment of such blade.

19. A propeller mechanism having a nut for attaching the mechanism to an engine crankshaft and operable to pull the propeller out of mounted position on such crankshaft when desired, as for general inspection or propeller replacement.

Further objects and features of the invention will become apparent from the following description.

For illustrative purposes the mechanism and apparatus are shown as adapted to serve in a propeller with three blades. The mechanism serves essentially in the same manner when a different number of blades is used.

Figure 1:
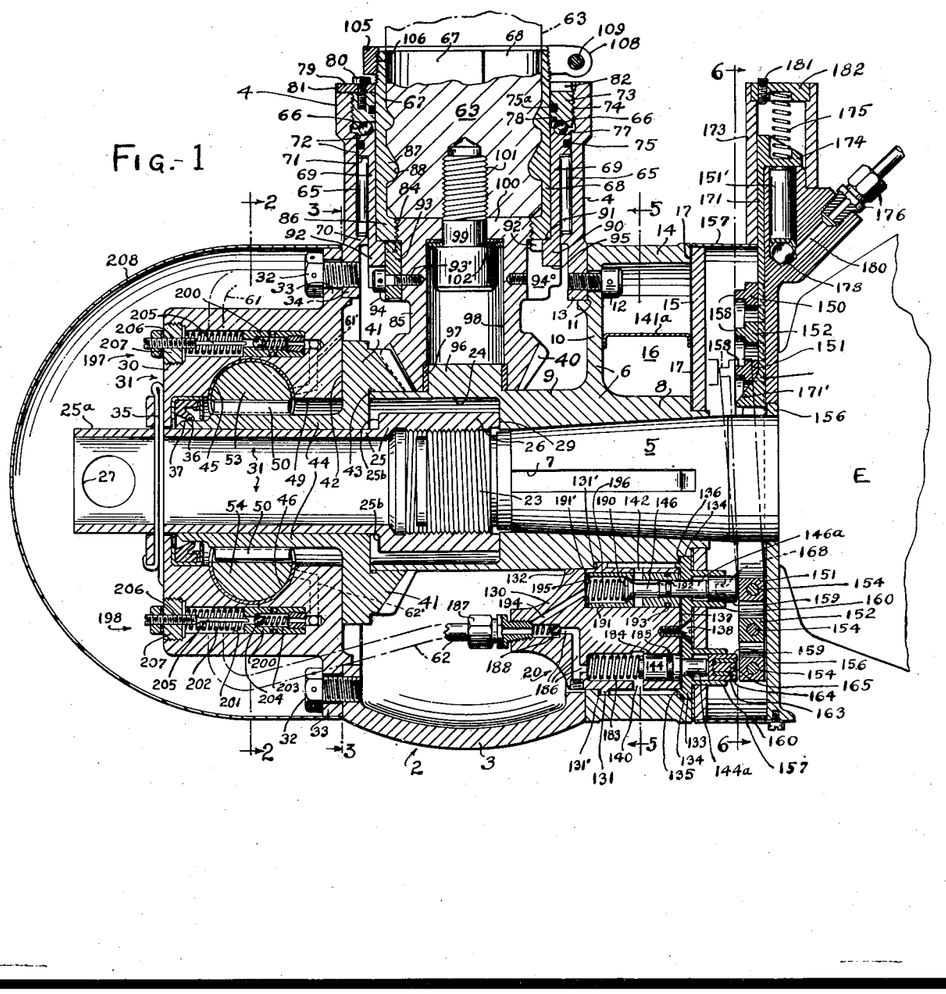
Fig. 1 is a central longitudinal assembly sectional view in a vertical plane through the hub, said plane centrally cutting the mounting of one of the blades.
Figures 2, 3, 4:
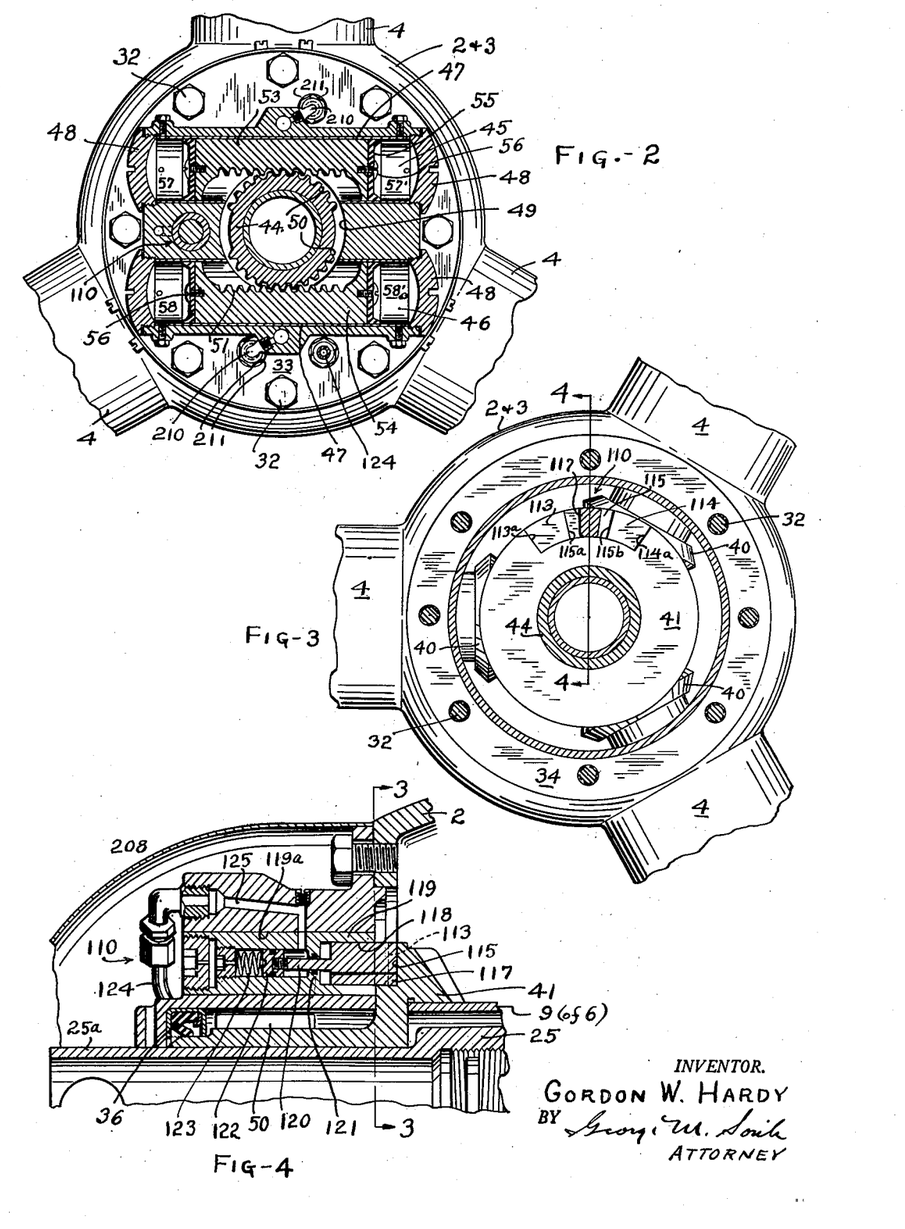
Fig. 2 is a transverse sectional view as indicated by the line 2—2 on Fig. 1, principally showing the blade adjusting servomotor arrangement.
Fig. 3 is a transverse sectional view taken along the line 3—3 on Fig. 1, principally showing a manually controlled limit stop mechanism by which the angular adjustment of the blades is ordinarily limited to pitch variations suitable for normal forward flight and releasable to permit greater angular adjustment in opposite directions as for feathering and reverse.
Fig. 4 is a detail assembly view of the limit stop mechanism as indicated by the line 4—4 on Fig. 3.

Referring further to Figs. 1 to 3, the hub 2 is made as a high tensile steel shell (e. g. forged steel) having a spheroidally formed hollow central portion 3 from which tubular integral arms or blade-supporting barrels 4 extend radially, shown as three in number. The barrels are spaced equally about the axis of rotation of the hub, which is to say the axis of a crankshaft 5 shown in Fig. 1 as projecting from an engine or motor of the craft served. Part of such engine is designated E. The hub is supported on the crankshaft 5 through the intermediary of a light weight high tensile steel hub carrier 6 securely fastened to the hub. A central tubular portion of the carrier is wedged onto and drivingly keyed to a tapered portion of the crankshaft as at a keyway 7, Figs. 1 and 5.

The tubular portion of the hub carrier extends rearwardly as at 8 and forwardly as at 9 from a wall or web portion 10 of the carrier (see Fig. 5) which latter portion is suitably shouldered as at 11 for attachment to the hub as by a series of screws 12 passing through the wall or web and into an inturned peripherally continuous flange 13 of the hub which is machined to fit the shoulder surfaces 11 of the carrier.

Surrounding and in spaced relation to the rearward tubular extension 8 of the carrier, the wall or web 10 of the latter has an annular flange portion 14 of slightly less length than the extension 8 and concentric therewith, so that the two portions 8 and 14 and the supporting wall or web 10 constitute a generally imperforate annular channel. The channel is bridged by a cover plate 15 and the annular space 16 so enclosed is hermetically sealed in part by the cover plate through the medium of a soft metal gasket 17 (e. g. lead), squeezed tightly between end shoulder surfaces of the portions 8 and 14 and marginal surfaces of the plate 15 when the plate is attached to the carrier as by appropriate screws not shown but which enter the concentric portions 8 and 14. The gasket 17 may be substantially coextensive with the cover plate 15 for further insuring, as nearly as possible, that the enclosed space 16 will be hermetically sealed. The screws 12 preferably have soft metal gaskets (or other sealing material, not shown) beneath their heads and forced against the carrier wall or web 10. Further sealing for the space 16 is provided in connection with pump and valve units 20, 21 and 22 (see Figs. 5 and 7) through which the bodily rotated, pitch-adjusting hydraulic system, which is supplied with hydraulic fluid exclusively from the hermetically sealed anular sump afforded by the space 16, is caused to be operated in the desired manner as will be explained later.

The expression "hermetically sealed" as used herein means that no relative rotation occurs between surfaces which cooperate to obstruct passage of fluid therealong or therepast. Where no relative motion between such cooperating surfaces occurs hermetic sealing may be accomplished even without the use of special sealing material, as by press fitting of metal parts; and, when sliding relative motion occurs, the use of known elastic sealing material, for instance synthetic rubber in annular form and appropriate cross section, is fully effective to accomplish hermetic sealing. But where relative rotation between such surfaces occurs, particularly at speeds comparable, for example, to the average rotational speed of an aircraft propeller, and particularly when driven by low horsepower high speed engines such as used on light weight airplanes, hermetic sealing is impossible as a practical matter mainly because of frictionally generated heat and the inability of known sealing materials to withstand it.

Forwardly beyond the tapered portion of the crankshaft said shaft has a threaded portion 23 lying within a counterbore 24 of the hub carrier. A tubular nut 25 having an internally threaded enlargement at 26 around the threaded portion of the shaft extends forwardly beyond the principal portions of the hub assembly where the nut is provided with a cross bore 27 for enabling use of a capstan bar to turn the nut and force a shoulder 29 thereof against a complementary shoulder of the carrier 6 to wedge the carrier onto the crankshaft.

A housing 30 for a blade adjusting servomotor generally indicated at 31, Figs. 1 and 2, is secured to the forward face of the hub 2 centrally thereof as by a series of screws 32 which pass through a circular flange 33 of said housing 30 into threaded openings in a forwardly disposed, inturned flange 34 of the hub. A split cotter pin 35, positioned as clearly shown by Fig. 1, engages circumferentially spaced recesses in the housing 30 and sleeve 25a and holds the nut 25 against turning out of seated position on the crankshaft.

The blades of the propeller have their shank portions disposed inside the barrels 4 concentric therewith and radiating from a point lying in the region of the threaded portion 23 of the crankshaft about which the spheroidally formed surface portions of the hub are generated. Secured to the inner ends of the blade shanks by means to be described below are identical bevel, blade adjusting gears 40 in zero blacklash mesh with complementary teeth of a master or power gear 41 concentric with the crankshaft 5 and journalled on the hub carrier 6. The gear 41 has its principal radial support on the forward extremity of the tubular portion 9 of the hub carrier and axial thrust support in a forward direction by reason of abutting the servomotor housing 30 as at 42 over a comparatively wide face of said housing. Rearwardly the gear 41 abuts a fairly narrow annular surface 43 on said extension 9 of the hub carrier. The master or power gear 41 has a generally tubular hub portion 44 surrounding the forwardly extending tubular portion 25a of the nut 25 but said hub portion 44 of the gear 41 does not ride upon the nut for support.

It may be noted at this point that the enlarged rearward portion 26 of the nut 25 forms a shoulder at 25b which is adapted to engage the rearwardly disposed forward face of the power or master gear at the inner margin of said face so that when the cotter pin 35 is removed from the position illustrated the nut 25 may be operated to loosen the propeller assembly preparatory to removing it from operating position on the crankshaft. The master gear 41 is blocked against forward movement out of the position in which illustrated by the engagement of said gear with the block or housing 30 of the servomotor. By "back turning" of the nut 25 until the abutment 25b thereof engages the adjacent rearward face of the master gear 41 and then further turning the nut in the same direction, the complementary conical surfaces of the crankshaft and carrier portions 8 and 9 may easily be separated notwithstanding any conceivable amount of static friction tending to prevent such separation, as when considerable corrosion has occurred at the contacting conical surfaces.

Referring to the servomotor as shown by Figs. 1 and 2, said servomotor comprises parallel cylinders 45 and 46 formed in the block or housing 30 and if the block is made of material such as aluminum, in order to minimize weight, then the cylinders preferably are constituted by steel sleeves 47 pressed into parallel complementary bores of the block. The cylinder sleeves are maintained in position and closed at their opposite ends as by removable threaded plugs or caps 48 of identical construction as obvious from Fig. 2. The cylinders 45 are intercepted by an axial bore 49 through the block 30 and coaxial with the hub 44 of the master or power gear 41. Said bore 49 is in surrounding spaced concentric relation to the hub 44 and the hub has formed thereon pinion or gear teeth 50 which mesh with rack teeth 51 of substantially identical double ended pistons 53 and 54 in the cylinders 45 and 46 respectively.

In order to obtain the desired mechanical advantage and, concomitantly, to secure transverse compactness of the servomotor assembly, the sides of the pistons are cut away as indicated in Fig. 2 and the rack teeth 51 of the pistons are formed on the cut away portions. The sleeves 47 are also cut away at mutually adjacent sides to receive the hub 44 and gear or pinion teeth 50 thereof. The ends of the pistons are provided with elastic sealing cups 55 preferably attached to the pistons as by central screws 56. Flange portions of the sealing cups are self-expanding into tight sealing contact with the inner walls of respective sleeves 47.

Figure 7:
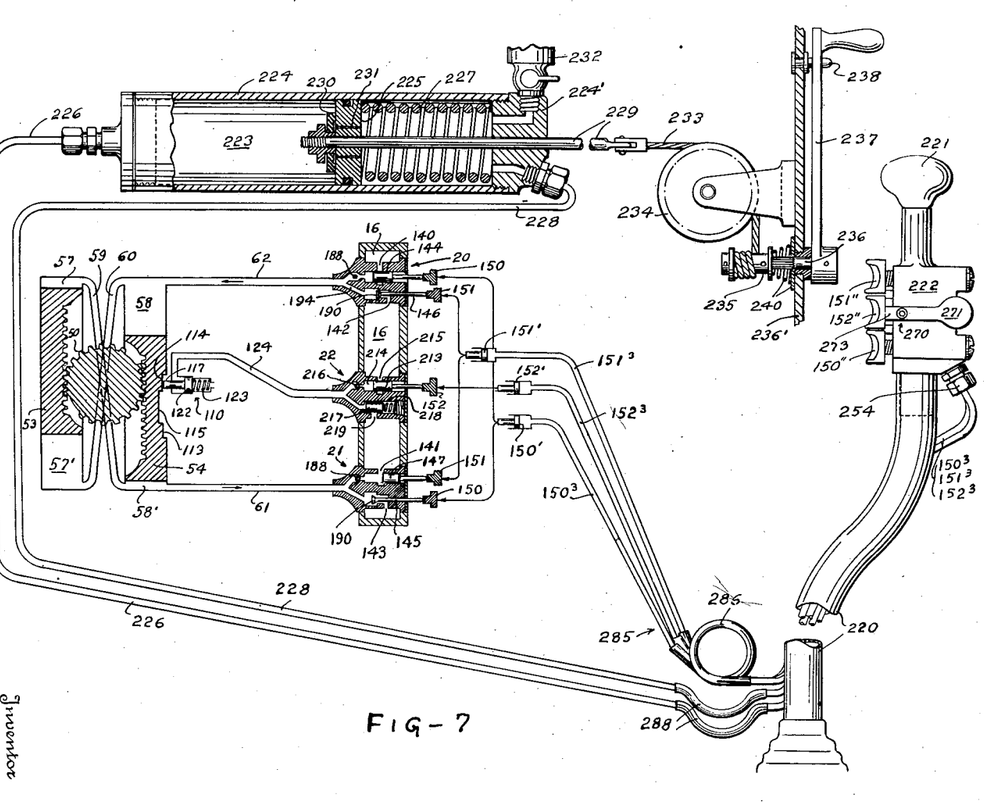
Fig. 7 is a partially schematic view showing two cooperating hydraulic systems one being rotatable with the propeller and the other being arranged for actuating the first system and not rotatable with the propeller, said second system including a pressure accumulator and selective master control valve means for initiating operation of the different parts of the first system from a common point as on the control column of an aircraft.

The pressure chambers 57, 57' and 58, 58' between the sealing cups and plugs or caps 48 are cross connected in the manner schematically shown in Fig. 7 by suitable bores 59 and 60 in the servomotor block 30 so that fluid supplied and discharged as through conduits 61 and 62, Fig. 7, will move the two pistons 53 and 54 simultaneously but in opposite directions in driving the master or power gear through the rack and pinion tooth connections. The manner of forming the necessary passages in the servomotor block is more clearly described in my copending application Serial No. 498,492, filed August 13, 1943 now Patent No. 2,433,990.

The generally enclosed space within the propeller hub and including the bore which receives the hub 49 of the master or power gear is sealed at the outer end of the servomotor casing as by an elastic annular sealing assembly of conventional form shown at 36 and including a yielding sealing flange in continuous peripheral contact with a circular surface 37 on the hub 44 of the power gear.

Additional and similar sealing means are provided for the different blade assemblies, as will be described later, so that the space inside the hub and said bore 49 can be packed with lubricating oil or grease and the same prevented from seeping out of said space or being squeezed out by centrifugal force.

The blades, a shank portion 63 of one of which is shown in Fig. 1, are supported for free turning movement about the radial axes of the respective arms or barrels 4 on bearing assemblies including rollers 65 and axial thrust bearing ball elements 66 retained in position in much the same manner as are the correspondingly positioned bearing elements of my application Serial No. 498,492 mentioned above. Only one blade mounting is illustrated and will be described, since all mountings are the same.

The shank of the blade is strongly secured at coarse rib and groove formations 87, 88 to half shell sections 67 and 68 which complement each other to form, in effect, a split generally cylindrical mounting and clamping sleeve or collar. The sleeve sections 67 and 68 lie partly within a hardened and ground thrust sleeve 69 which forms an inner bearing race surface for the rollers 65 and one race for the thrust bearing balls 66. The rollers make contact directly with the inner bore of the barrel 4, being confined against endwise movement by and between an annular rib 70 in the barrel and an annular shoulder 71 provided on a thickeneed outer end portion 72 of the thrust sleeve 69.

Cooperating with the thrust surfaces of the sleeve 69 in supporting the balls 66 and holding the thrust sleeve and other members secured thereby in place in the barrel with the desired working clearance is a blade securing nut 73 (blade nut) threaded as at 74 into the outer end of the barrel. It is advisable to provide a seal between the thrust sleeve and the inner wall of the barrel near the outer end of the thrust sleeve. Such seal is afforded by a continuous elastic sealing ring 75 seated in a peripheral groove in the thickened portion 72 of the thrust sleeve. The race surfaces for the balls 66 on the thickened portion 72 of the thrust sleeve and on the blade nut 73 may be simply channel grooves as shown in my said copending application; but, preferably in order to make the balls constitute both radial and end thrust bearing members and in order to cause the balls 66 to bear outwardly toward the threads of the blade nut 73, thus tending to lock said nut, opposite sides of the ball race channels are cut away as indicated at 77 and 78. Thus the balls serve more effectively, in effect, to lengthen the radial bearing for the blade afforded by the rollers 65 but without having to lengthen the rollers. The race formations just described also avoid axial stress on the outer rim of the thickened portion 72 which rim occurs by reason of providing, in said thickened portion, the recess for the sealing ring 75. Additional sealing is provided to retain the lubricant for the balls 66 (e. g. grease) by reason of an elastic sealing ring 75a seated in an internal peripheral groove of the blade nut 73 and blocking egress of lubricant between the blade nut and composite sleeve 67, 68.

The blade gear 40 as will be presently demonstrated is so secured to the blade shank assembly including the thrust sleeve 69 that inward movement of the blade toward the center of the hub is resisted by abutment of end shoulder surfaces of the gear with the hub carrier 6 so that the blade nut 73 when turned in its threaded connection sufficient to take up the desired clearance adjacent the balls 66, cooperates with such end surfaces of the gear 40 to prevent more than slight axial movement of the blade shank portions inwardly in the barrels 4.

When properly positioned the blade nuts 73 are locked by key members 79 secured as by screws 80, one key and one screw being shown. One key is sufficient for each blade nut. The slots for the keys in each nut 73 and corresponding barrel are of unequal number for vernier adjustment. For example, there may be eight key slots 81 in the outer end of the barrel and nine key slots 82 in the adjacent end portion of the blade nut 73. This enables fifty-seven relatively turned and keyed positions of nut and barrel.

The blade gear 40 is secured to the sleeve sections 67 and 68 against relative axial movement by a threaded connection at 84 between an outer end portion of the hub 85 of said gear and inwardly extending thickened flange portions 86 of the sleeve sections 67 and 68. The sleeve sections 67 and 68 are pressed into the thrust sleeve 69 so that, opposite the coarse groove and rib effects 87 and 88 of the sleeve, the blade shank or butt is tightly embraced by the sleeve sections although not sufficiently tightly to prevent rotation of the blade about the axis of the shank for initial pitch setting and balancing purposes. The inner end of the thrust sleeve 69 has an inwardly thickened portion 90 axially abutting the inner ends of the sleeve sections 67 and 68 as at 91. The sleeve sections have relatively short (castellate) axial extensions 92 lying beyond the plane of the abutment face 91, which extensions 92 are formed by equally spaced radial key slots in said sleeve sections. Two of the slots are formed as half slots in each of the sleeve sections 67 and 68 so that said sections are fully symmetrical. The threads 84 continue to the ends of the castellate extensions as illustrated. The radial slots of the sleeve sections 67 and 68 are diametrally opposite each other and are of suitable proportions to receive the locking keys of generally rectangular cross section, one of which keys is illustrated in longitudinal section at 93, see left part of gear 40, Fig. 1. Two keys 93 are used, one being omitted for illustrative purposes.

The keys 93 enter radial slots 94 in enlarged flange portions of the hub 85 and extend into the slots between the castellate extensions 92, being secured to the gear hub as by individual screws 93', one of which is shown. The preferred arrangement of key receiving slots is the formation of ten slots on the composite sleeve 67, 68 and four slots 94 on the hub of the blade gear so that in tightening the threaded connection at 84, causing an axial abutment at 95 between the thickened end 90 of the thrust sleeve and an adjacent shoulder of the blade gear, there will be considerably greater than four relatively turned positions between the gear and sleeve into which a pair of keys can be seated (vernier arrangement).

There can always be an absolutely tight jamming at 95 between the gear and adjacent end of the thrust sleeve 69 because if less space is afforded for the keys 93 than the width of the key slots, narrower keys can be used so long as a pair of key slots on the gear can be brought into at least partial alignment with a pair of key slots on the composite sleeve 67, 68. The above arrangement constitutes a full vernier jamming adjustment between the gear and sleeve section assembly.

Cooperating with the bearings 66 and the blade nuts 73 in holding the blades in the desired positions along axes disposed perpendicular to the axis of the crankshaft and also assisting the radial thrust bearings 65, the innermost ends of the blade gears are each piloted on the hub carrier 6 at radially projecting cylindrical stub portions 96 of the carrier, which stub portions enter axial counterbores of respective gears provided with suitable radial bearings at 97, for instance "Oilite" sleeves.

Additionally, to secure each blade gear 40 to the butt portion of the respective blade, studs, one of which is shown at 99, lie partly within axial bores 98 of the blade gears which extend outwardly beyond the bearing sleeves 97. Said studs extend through respective end wall portions 100 of the blade gears for threaded connection at 101 with the blade shanks. The studs 99, in addition to serving to fasten the blade gears to the blade butts, are also adapted to support balancing washers as beneath the heads of the studs and the walls 100 of the gears. Two of such washers are indicated at 102 beneath the head of the stud 99 illustrated.

The composite sleeve or collar constituted by the shell sections 67 and 68 extends beyond the outer end of the barrel 4 for supporting a locking and balancing ring 105 thereon. As shown the composite sleeve is provided with tapered threads at 106 with which complementary threads of the ring 105 cooperate in such manner that as the ring is turned on the threads in the direction to move it toward the center of the hub, slightly separated mating edge portions of the sleeve sections 67 and 68 will be forced toward each other to cause said sections to be forced tightly against the shank of the blade. In order finally to fix the position of the locking ring 105 to cause greater clamping force than could possibly be exerted by turning the ring 105 and causing contraction at the tapered threaded connection, the ring is split at one side as at 107. Enlarged paired portions 108 of the locking ring receive a tangentially extending clamping bolt 109 having suitable means to hold or lock it in clamping position. The nut of the bolt 109 may be wired on. The threaded connection at 106 enables the ring to be turned as by hand until it cannot be forced any further thereby at the threaded connection 106. Since the only force necessary to effect strong clamping force by the ring 105 against the sleeve sections is exerted by the bolt 109, the ring may be turned with its relatively heavier (bolt carrying) portion into any desired position about the blade shank, thus enabling partial or complete dynamic balancing of the propeller assembly in event of unbalance thereof when fully assembled and mounted on a test spindle.

Referring to Figs. 3 and 4 a latch mechanism 119 is provided normally to prevent the blades from being shifted above and below maximum and minimum pitch angles appropriate for forward driving of the craft served, while enabling angular movement of the blades on their swivel mountings below minimum normal pitch for reverse (e. g. for braking) and above maximum normal pitch (e. g. for feathering). In Fig. 3 turning of the master or power gear 41 clockwise effects high pitch and counterlockwise low pitch. As illustrated in Figs. 3 and 4, the forward surface 111 of the master or power gear 41 is arcuately and axially indented at regions 113 and 114; and between those indentations is a similar, deeper indentation 115. Normally seated in the indentation 115 is a latch block 117 slidable in a non-circular guide bore 118 of a latch mechanism guide sleeve 119. The guide sleeve may be pressed into a bore 119a in the servomotor block 30 as a means for mounting the latch block. The latch block has a stem 120 projecting slidably through a partition wall 121 of the guide sleeve 119 into a cyclinder bore in which a piston part 122 of the stem slides. A spring 123 in a vented forward part of the cylinder normally biases the latch block 117 toward whatever indented face (113, 114, or 115) of the master or power gear 41 the block may be adjacent.

Figures 5, 6:
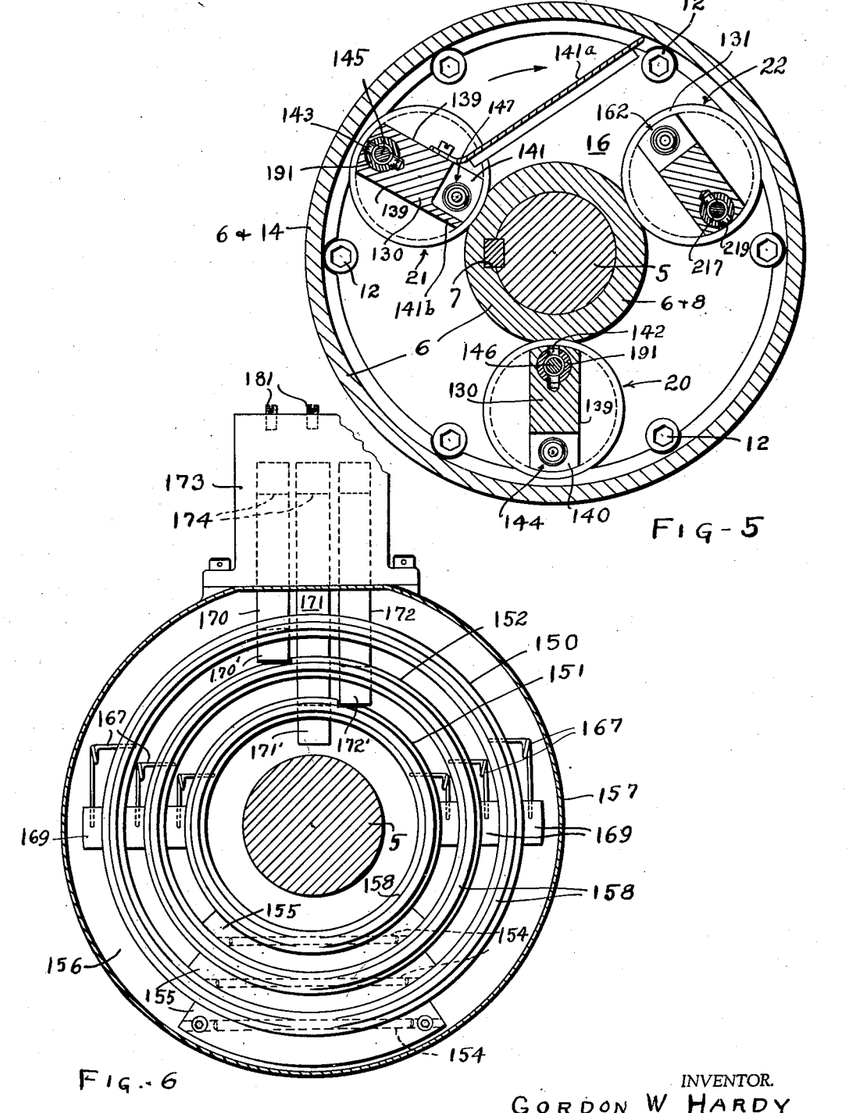
Fig. 5 is a transverse sectional assembly view as indicated by the line 5—5 on Fig. 1 showing the relative positions of pump and valve unit assemblies for causing actuation of the servomotor and for releasing the limit stop.
Fig. 6 is a transverse sectional view as indicated by the line 6—6 on Fig. 1 showing a preferred mounting arrangement for a set of concentric cams which actuate the movable elements of the pump and valve unit assemblies mentioned in connection with Fig. 5.

To operate the latch block to master-gear-releasing position, relative to abutment surfaces 115a and 115b defining opposite circumferentially spaced limits of the indentation 115 of the master gear, fluid is supplied under pressure from the pump and valve unit 22, Figs. 5 and 7, through a tube 124, Figs. 4 and 7, and a passage 125 to the bore which contains the piston 122 and at the end of the piston which lies adjacent the latch block 117. The wall 121 serves to limit the latch withdrawing movement to such distance that when the latch block is moved out of the indentation 115 it is in operative alignment with the abutment shoulders 113a and 114a of the indentations 113 and 114 respectively.

Once the latch block 117 is withdrawn from the indentation 115 and the master gear 41 then is moved to such position that one of the indentations 113 or 114 is in operative alignment with the latch block the fluid force which withdrew the block may then be released with assurance that the gear will finally be arrested in full feathering or safe reverse pitch position by one or the other of two abutments 113a or 114a respective to the indentations 113 and 114, depending upon which operation is selected as the desired abnormal pitch adjustment.

Referring further to Fig. 7 wherein the pitch adjusting servomotor, pitch limit latching abutment and pump-valve units 20, 21 and 22 are shown diagrammatically as though in a single plane intersecting the supply sump 16, earlier described, it may be noted that the pump valve unit 20, which is the unit shown in detail in Fig. 1, is operatively related to the conduit 62 leading to the space 58 of the servomotor and the unit 21 is operatively related to the conduit 61 leading to the servomotor space 58'. The pump-valve unit 22 is operated, as will be explained later, to supply fluid through the duct 124 to the latch mechanism 110 of Figs. 3 and 4 earlier described.

The pump-valve units 20 and 21 are nearly identical in construction (differing essentially only in position) hence the showing of unit 20 on Fig. 1 will suffice to explain the construction of the unit 21. The pump mechanisms of the units 20 and 21 are positively actuated to supply hydraulic fluid to the servomotor and the valve mechanisms of the units 20 and 21 are positively actuated for fluid discharge purposes in respect to the servomotor as will later be more fully explained.

Each of the pump and valve units 20 and 21 comprises a generally cylindrical body portion 130, provided intermediate of its cylindrical exterior surface and near its forward end with a continuous annular flange 131 seated against an annular sealing gasket 131' of soft metal located in a counterbore portion of a through bore 132 in the wall or web 10 of the hub carrier. At the rearward end of the body 130 the same is abutted by an end cap 133 which is seated in diametrally opposed counterbore surfaces 134 in the portions 8 and 14 of the carrier. Said counterbore surfaces intercept only the central annular portion 8 and the outer concentric annular portion 14 of the carrier, which two portions cooperate in forming the inner and outer walls of the sump space 16 as already described. The end cap 133 has a pilot joint connection formed by a rib 135 which telescopes the rearward end of the generally cylindrical body 130, and said end cap is pressed forwardly during assembly of the carrier and pump-valve units so as to cause the body 130 to compress the seal 131' and an additional annular seal 136, beneath the margin of the end cap, when the cover plate 15 is applied and secured by the two series of fastening members (not shown) entering the carrier portions 8 and 14 to close the rear of the sump space 16.

The end cap 133 is maintained in sealed relation to the body 130 by a soft metal gasket 137 which lies across the rear end face of the body 130 and is squeezed between the latter and the front face of the end cap by a central fastening screw 138 connecting the body and end cap.

As will be seen from Fig. 5, the peripheral surfaces of the bodies 130 of the respective pump-valve units 20 and 21 are fully spaced from adjacent walls of the sump chamber 16 all around each body 130 and each body is cut away on opposite sides as at 139 to reduce weight. The necessary inlet passages for fluid in the bodies 130 of units 20 and 21 for communication with the sump space extend radially as at 140 and 141 respectively. The inlet passages are formed by transverse slots in the bodies 130, one slot (that of unit 21) facing inwardly toward the crankshaft and the other (that of unit 20) outwardly therefrom. The discharge passages for fluid in the bodies (leading to sump) are similarly located and are shown as radial bores in the bodies 130. Discharge passage 142 of unit 20 extends radially in the associated body 130 toward the crankshaft, and the discharge passage 143 of unit 21 extends outwardly away from the crankshaft. The relatively opposite arrangement of inlet and discharge passages is provided in order to enable axially extending pump and valve plunger members in pump and valve chambers which intercept or communicate with the passages to be located in coacting pairs different distances from the crankshaft center as follows.

Pump plunger 144 of unit 20 and valve plunger 145 of unit 21 (see Fig. 5 for relative positions) constitute an operative pair of fluid displacing and discharge elements lying equal distances from the crankshaft axis and being actuated by an operating cam 150 of annular form (Figs. 1 and 6) non-rotative with the propeller but arranged to be moved by rotation thereof to cause operation of the plungers in timed relation whereby to energize or condition the blade adjusting servomotor for movement in one direction. Valve plunger 146 of unit 20 and pump plunger 147 of unit 21 constitute the other cooperating pair of fluid discharge and displacing elements; and those elements lie equal distances from the crankshaft axis appropriate for actuation, through rotation of the propeller, by a different but similar annular cam 151 concentric with the cam 150 to energize or condition the servomotor for pitch adjusting movement in the opposite direction. Another annular cam 152 is provided to operate a pump plunger 153 (Figs. 5 and 7) of the pump-valve unit 22 serving the hydraulically releasable latch mechanism 110 of Figs. 3 and 4.

The cams 150, 151 and 152 and/or the displacing and discharge elements actuating the servomotor and latch mechanism of the hermetically sealed rotary hydraulic system could be operated or rendered operative other than by power furnished through rotation of the propeller; but in the present arrangement all the fluid handling mechanisms of said system are so energized or actuated. The control therefor, as hereinafter described, is a manual control. Automatic or semi-automatic control could be used instead or ancillary thereto as already known in the variable pitch propeller art or, for further example, as shown and described in my prior application Serial No. 498,492.

The three cams 150, 151 and 152 may be pivoted on respective parallel pins 154 carried on arcuate brackets 155 all of similar construction projecting forwardly from an adapter plate 156 extending across and suitably secured fixedly to the forward end of the engine crank case parallel with the cover plate 15 of the sump 16. The space between the adapter plate and sump cover 15 is closed peripherally by an annular shell 157 secured to the adapter plate and slidably telescoping the cover as shown in Figs. 1 and 6.

Annular rib portions 158 of the three cams 150, 151 and 152 are rendered active to operate the respective pump and/or valve plungers of the units 20, 21 and 22 through frictional contact with floating tappets or push rods 159 in tubular guide portions 160 of the end caps 133 of the various pump-valve units 20, 21, 22. The tappets, when engaged by the cam ribs 158 in forwardly swung positions of the cams, bear against stems 144a and 146a of the pump plungers 144 and valve plungers 146 respectively of the units 20 and 21 and against a similar stem of the pump plunger 162 of the unit 22 (Figs. 5 and 7).

The tappets (lower right on Fig. 1) comprise cup-shaped metal bodies 163 the closed ends of which bear on the plunger stems to be operated. Self-oiling sleeves 164 (e. g. "Oilite") seated in the cups embrace and support extremely hard metal cores 165 such as "Carboloy." The exposed ends of the cores bear on the ribs 158 of the cams and, being supplied with lubricant from the "Oilite" sleeves, have been found to be practically completely wear resisting; and to operate without appreciably wearing the cam ribs 158. The hardened surfaces of the ribs are merely polished by operating engagement with the tappets at relatively high propeller speeds.

In order that the floating push rods or tappets 159 may be guided for a considerable portion of their length by the extensions 160 of the end caps 133 of the pump-valve units, said extensions are oppositely notched as at 168 (upper tappet on Fig. 1) to receive the ribs 158 when the latter are thrust forwardly to valve or pump actuating positions.

The cams 150, 151 and 152 are operated, for example, by hydraulically actuated plungers 150', 151' and 152', respectively (Figs. 7 and 8) of a hydraulic system separate from that which rotates with the propeller; and the control for causing selective operation of the cams includes a set of readily manipulatable keys 150", 151", and 152", Figs. 7 to 10, inclusive, mounted on the control column of the craft served by the propeller mechanism and arranged to operate control valves of said hydraulic system as will be described later.

The innermost cam ring 151 may be considered as arranged to actuate the blade adjusting servomotor in the direction to increase blade pitch and the cam 150 to cause decreasing pitch and reverse pitch. There is actually very little, if any, difference in the operating efficiency of the relatively larger and relatively smaller annular cams, for while the speed of relative movement between such smaller cam and the pump or valve tappet operated thereby is less than in the case of the larger cam and hence the former would tend to generate less total friction, the smaller cam has to operate at a steeper cam angle than does the larger for effecting a given pump displacement per cycle, thus approximately balancing the operating efficiency of the cams.

The annular cams 150, 151 and 152 are provided with paired springs 167 (Fig. 6) of suitable construction mounted on brackets 169 of the adapted plate 156 and which project beside and/or between the cams with suitable clearance not shown. The springs normally hold the cams against the front face of the adapter plate. The hydraulic plungers 150', 151' and 152' act to swing the respective cams forwardly about their pivots 154 into pump and valve actuating positions through the intermediary of slide bar cam members 170, 171 and 172 supported in guideways in a housing 173. The respective cam surfaces of the cam bars are designated 170', 171' and 172' and their manner of operation on the annular cams will be obvious from Figs. 1 and 6. Rearwardly projecting head portions 174 of the cam bars are engaged directly by the plungers 150', 151' and 152', which plungers lift the cam bars against the force of return springs 175 in the housing 173. Only one cam bar head, hydraulic plunger and return spring assembly is illustrated in detail.

Hydraulic fluid is introduced to the three cylinders of plungers 150' etc. through conventional tube fittings 176 installed as indicated on Fig. 1 on an upper rearwardly extended portion 177 of the adapter plate 156 in overhanging relation to the engine housing. Balls 178 beneath the plungers 150', 151' and 152' and located at the effective bottoms of the cylinders for the plungers (see Fig. 1) prevent the plungers or sealing cups 179 thereof from closing fluid supply passages 180 leading to the cylinders.

The amount of displacement per cycle (propeller turn) on part of the pumps 144 and 147 can, for example, be varied by adjustment of the forward swinging movement of the cams 150 and 151 wherefore the rate of operation of the pitch adjusting servomotor for reverse pitch movement can be accelerated over forward pitch adjustment movement as may be desired in order more promptly to obtain reverse pitch for emergency braking effect on the aircraft served by the propeller mechanism. Since the amount of forward swinging movement of the cams, hence the distance of movement of the pump plungers, is a function of the distance the cam bars 170 and 171 are lifted by the plungers 150' and 151' the cyclic pump displacements may be limited and adjusted by variably positionable abutments as at 181, Fig. 1, on a cover member 182 of the cam housing 173.

Referring further to the construction of the pump-valve units, as exemplified by unit 20 at the lower right in Fig. 1, the pump plunger 144 is shown in the position in which it is moved as by a return spring 183 to the rear of the inlet slot 140 of the body 130 communicating the plunger cylinder bore 184 of said body with the sump. The plunger 144 has an elastic ring seal 185 maintained by elasticity of the sealing material thereof in peripheral hermetic sealing contact with the cylinder bore 184. A discharge passage 186 in the body 130 leads from said cylinder bore 184 to the duct 62 shown as a pipe connected to the forward reduced end of the body 130 as by an appropriate high compression fitting assembly 187. A spring biased non-return or check valve 188 occupies a discharge portion of the passage 186 and is opened only when the pump plunger is making its delivery stroke.

The valve plunger 146 has, as shown, a poppet type head 190 closing against an annular "line" seat in a valve guiding sleeve 191 containing part of the previously mentioned discharge passage 142 of the valve. The rearward end of the valve sleeve forms the guide bore for the valve plunger stem portions, and elastic hermetically acting sealing rings at 192 and 193, around the valve stem and sleeve respectively, block leakage of hydraulic fluid rearwardly from the valve assembly. A discharge passage 194 in the body 130 carries fluid from the servomotor cylinder space 58 (see Fig. 7) to a counterbore 195 (Fig. 1) of the valve sleeve containing the poppet valve head 190 and a return spring 196 bearing thereon in a direction to close the valve when pressure by the annular cam 151 on the operating stem is removed. The passage 194 communicates with the duct 62, 186 (leading from the displacement chamber of the pump 144 to the servomotor) beyond the check valve 188 toward the servomotor, so that opening of the valve 146 can always afford free communication of the connected servomotor chamber (58, Fig. 7) with the sump 16. The construction of the pump and valve mechanisms of unit 21, Fig. 7, is essentially the same as that just described; but again it should be noted that the positions of pump and valve plungers of the two units 20 and 21 are relatively reversed in respective planes radially of the propeller.

As most clearly brought out on Fig. 5, the inlet 140 of the pump valve unit 20 is ideally positioned with respect to the outer wall of the sump 16 from the standpoint of making certain that the inlet will, due to centrifugal force acting on fluid in the sump, be immersed in hydraulic fluid at all times during rotation of the propeller. During such rotation if the sump chamber is not completely full the fluid will tend to draw away from the inner wall of the sump formed by the rearward extension 8 of the hub carrier; and, from the standpoint of maintaining immersion of the pump inlets in hydraulic fluid, the position of the pump valve unit 20 has an advantage over the position of the unit 21. In the latter case the inlet for the pump, in order for actuation of the pump plunger 147 by the annular cam 151, must be farther from the peripheral wall of the sump chamber.

As a matter of fact, due to the hermetic sealing of the valve and pump plunger stem portions of units 20, 21 and 22 and the valve sleeve of the units 20 and 21, no diminution of fluid in the system has been observed during operation of the mechanism for long periods of time. In event, however, that the system is not fully charged to begin with or that leakage should occur, I deem it advisable to provide for diversion of fluid toward the inlet 141; and that may be accomplished by the provision of a ramp or deflector of channel shape as at 141a, Figs. 1 and 5, which deflector is coextensive with the sump axially of the propeller and which may have its ends substantially in contact respectively with the outer peripheral wall of the sump chamber and the nearest adjacent face 139 of the body 130 of the unit 21. Cooperating with the deflector in maintaining the inlet 141 charged with fluid at all times, a flow obstructing or damming baffle may be provided as at 141b on the far side of the inlet slot 141 with reference to the deflector 141a. The radially inward terminus of the baffle 141b is spaced from the extension 8 of the carrier as clearly indicated on Fig. 5 so that fluid can pass beyond the baffle 141b and continue to circulate in the sump.

In order that each discharge valve 145 and 146 will always be opened (i. e. at least cracked) when pumping by the operatively associated pump, 147 and 144, respectively, commences it is necessary for one of the pump plungers to have a predetermined amount of idle movement before it can start pumping. Both pump plungers may be arranged for such idle movement, the same taking place while the forward ends of the plungers traverse the respective intake passages 140 and 141 (Figs. 5 and 7).

It will be observed by comparison of Figs. 5 and 6 (direction of rotation of the propeller indicated by an arrow on Fig. 5) that the annular cam 150 will first open the valve 145 of pump valve unit 21 and then begin to move the pump plunger 144 of unit 20, whereas the annular cam 151 acts in a reverse manner, first on the pump 147 and then on the valve 146.

Whenever the tappet of the pump plunger 144 approaches the climax of the cam 150 the ramp of that cam will already have opened the cooperating discharge valve 145; and, since considerably more than half the circumference of the cam is operative to hold the valve open, there is no possibility of the valve being closed before the climax of the cam has been passed by the plunger 144 and return or rearward movement of said plunger begins.

When the tappet of the pump plunger 147 approaches the climax of the cam 151 the coacting valve plunger 146, being in relatively trailing position, does not open the discharge valve passage from the servomotor normally blocked by the controlling valve thereof until the pump plunger 147 has been thrust forward a short distance. That distance of plunger movement, however, is insufficient to cut off the inlet passage 141, wherefore the pump plunger 147 displaces no fluid toward the servomotor space 58' (Fig. 7) until the valve plunger 146 has cracked the valve controlling discharge of fluid from the servomotor space 58.

It is apparent from the above description of operation that the pump valve units cannot, with the cam arrangement described, be as much as 180° apart taken in a direction opposite the direction of rotation of the propeller (see Fig. 5) and from pump plunger 147 to valve plunger 146, for otherwise the valve controlled by the latter will not be cracked soon enough on each cycle. It is also apparent from the above description that, if the conduits 61 and 62 communicate the valve and pump chambers of the units 20 and 21 directly with the servomotor cylinder spaces 58' and 58, as diagrammatically shown on Fig. 7, there can never be any appreciable back pressure opposing the pumping action of the pump plungers 144 and 147, and that the blades are hydrostatically locked in each adjusted position by the conjoint action of the plunger operated valves 190 and automatically operating check valves 188. Definitely adjustable back pressure may be provided in each or either direction of operation of the servomotor by the mechanisms generally designated 197 and 198, Fig. 1 only, which mechanisms are built into the servomotor block 30 and, in effect interposed in the ducts 61 and 62, respectively, of Fig. 7. Passages at 61' and 62', Fig. 1 (diagrammatically shown), lead from said mechanisms 197 and 198 to the associated opposed servomotor spaces 58' and 58. If the mechanisms 197 and 198 are used they can nearly serve the functions of the discharge control valves 190 in hydrostatically locking the valves against return movement after pitch adjustment has been effected.

The mechanisms 197 and 198 serve to prevent return movement of the pitch adjusting servomotor by reactive air thrust on the blades (assuming the associated discharge valves 190 fail to seat properly) until the air thrust reaches a predetermined value.

Each mechanism 197 and 198 comprises a plunger 200 slidably sealing a bore 201 in the servomotor block and maintained normally against the bottom of said bore by a calibrated spring 202 holding the plunger in such seated position with an initial force, for example, of 400# per square inch. Each plunger has an axial bore 203 containing a spring seated non-return or check valve 204 which admits flow of fluid to the servomotor from the pumps of respective units 20 or 21 comparatively freely but normally blocks return flow. Return flow can only occur when the pressure tending to create such flow is built up to a point somewhat greater than that resisted by the spring 202 (i. e. greater than the assumed 400# per square inch). When that occurs, and the plunger 200 is forced forwardly by said greater pressure, an adjustable check valve release pin 205 forces the plug of the check valve off its seat and escape of fluid to the forward end of the bore 201 hence to the instantaneously discharging duct 61 or 62 as the case may be. The pin 205 is screw threaded for adjustment at 206 into a plug 207 which closes the forward end of the bore 201. Adjustment of the screws 205 can be effected merely by removing a spinner cap 208 covering the servomotor housing and suitably attached to the base flange 33 thereof.

The mechanisms 197 and 198 have a special advantage by reason of their location. No piping, subject to possible breakage, is necessary between said mechanisms and the associated servomotor spaces.

The pipe or tubes forming the greater portions of ducts 61 and 62 (so indicated) connect with the servomotor block 30 at high compression elbow and sleeve fitting assemblies 210 as shown on Fig. 2; and, to support the pipe where they pass through the base of the servomotor block, diametrally split threaded sleeves 211 (Fig. 2 only) are utilized. The sleeves contain suitable annular resilient packing (not shown) snugly embracing the respective pipes; but when unscrewed from inserted position the sleeve sections come apart and permit the ferrule nuts on the outer ends of the pipes 61 and 62, constituting fixed enlargements of said pipes, to pass through the threaded openings of the servomotor block 30. Thus, when said block is removed from the hub for service or inspection, it is unnecessary to cut the pipes.

Referring further to the pump valve unit 22 which serves the pitch limit stop latch mechanism 110, said unit is shown only diagrammatically and in Fig. 7. The construction of unit 22, so far as the hermetic sealing means thereof is concerned, follows precisely the construction of units 20 and 21, except that the valve of unit 22 does not require any special sealing means. The intermediate one, 152, of the three annular cams causes actuation of a pump plunger 213 in a pump chamber 214 having an inlet slot 215 communicating with the sump 16. Fluid forced by the plunger 213 passes a non-return or check valve 216 and travels through the duct (pipe) 124 to the cylinder of the latch releasing piston 122 thereof. Only one or two strokes by the pump plunger 213 is or are necessary to release the latch block 117; and, when released, any excess output of the pump that may take place is discharged to the sump 16 by a forwardly spring pressed plunger 217 in a bore 218 of the body of the unit 22, laterally vented at 219. The vent 219 is normally covered and nearly closed by the plunger 217, and excess output on part of the pump 213 causes the vent to be uncovered as in a conventional fluid accumulator. The plunger fits the bore 218 loosely enough so that, after the latch mechanism 110 has functioned to release the blade adjusting gearing for abnormal pitch adjustment (feathering or reverse pitch), the pressure in the duct 124 is gradually relieved past said plunger 217, through the clearance space around it, to the vent 219.

Figures 8, 9, 10:
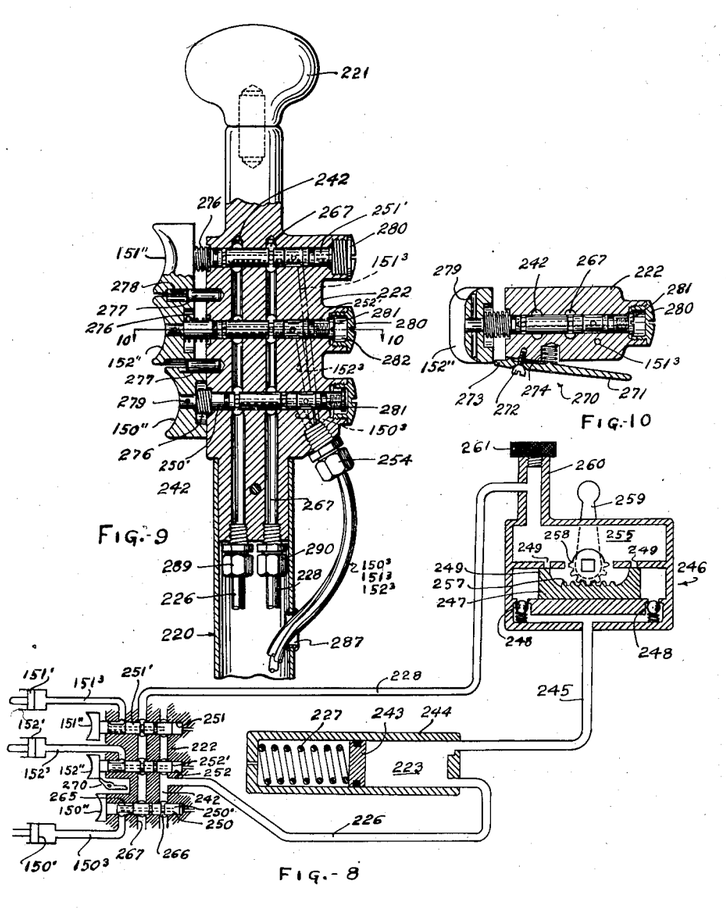
Fig. 8 is a view similar to Fig. 7 showing a modification in the manner of operating the accumulator and also showing the selective master control valve means diagrammatically.
Fig. 9 is a central sectional assembly view showing, more in detail, the selective master control valve arrangement built into a control column of the type generally referred to as a control "stick."
Fig. 10 is a transverse sectional detail view of the valve mechanism as indicated by the line 10—10 on Fig. 9.

The manner in which the annular cams are selectively actuated is further illustrated by Figs. 7 and 8. The manual control for the actuating hydraulic system is further shown by Figs. 9 and 10. In Fig. 7 a typical aircraft control column of the "stick" type is shown at 220 having a control knob at 221 surmounting a valve body 222 forming part of the top portion of the column. The control column 220, as usual, is hollow and affords space inside it for fluid conducting (e.g. copper) tubes necessary for hydraulic control. Operation of respective keys 150''—152'' diverts fluid received from an accumulator chamber 223 and supplied to a distributor manifold in said valve body 222, in a manner selectively to supply fluid to the actuators 150', 151', 152' for the annular cams 150, 151 and 152.

The accumulator of Fig. 7 comprises a cylinder 224 and piston 225 slidable therein and urged in the proper direction to discharge fluid, as through a delivery tube 226, by a spring 227. The cylinder space at the spring-contacting end of the piston constitutes a supply sump for fluid returned to the accumulator through a tube 228. The piston has a draw bar or stem 229 leading through a head member 224' of the cylinder 224 by which the piston may be drawn back to initial position (right, Fig. 7) after the spring has forced the piston as far as it will go in the fluid discharging direction. A check valve assembly comprising a flexible disc 230 in sealing relation to an annular series of holes 231 through the piston enables displacement of fluid from the sump end of the cylinder to the discharge end as the piston is moved by the draw bar to restress the expanded spring. A charging inlet device 232 is provided through which charging of the system with fluid may be effected or lost fluid replaced.

To restress the accumulator spring a flexible tension member or cable 233 may be guided by a suitably supported pulley 234 to a windlass drum 235 fast on a pin 236 turnably journalled for example on the instrument panel 236' of the craft served or some other convenient support on such craft. The end of the pin 236 which projects through the exposed face of said panel or support is provided with a crank arm or handle 237 which, when given one turn (e.g. clockwise), so as to bring it against a fixed stop 238 (the position in which shown) fully stresses the spring and charges the accumulator for further service of the system. When the operator notes that the handle has returned nearly to the opposite side of the stop 238 he knows that the system needs recharging and gives the handle another clockwise turn. A friction detent mechanism at 240 on the pin 236 prevents slack in the cable from taking place as when the handle would tend to remain in or fall toward a depending position.

The arrangement of control valves in the body 222 of the control arrangement according to Fig. 7 is the same as exhibited by Figs. 8 to 10 wherein the valves are shown in detail.

Referring to Fig. 8, the valve chamber and plunger construction inside the body 222 is such as to provide a distributor manifold 242 within said body leading to bores 250, 251 and 252 within which valve plungers 250', 251' and 252' are slidably arranged and connected to the respective keys 150'' to 152''. The distributor manifold 242 intercepts the various bores as clearly apparent on both Figs. 8 and 9. For illustrative purposes only, the manifold 242 is shown at the right in Fig. 8 whereas said manifold is at the left in the physical embodiment of the valve mechanism as shown by Figs. 9 and 10.

The accumulator in Fig. 8 is different in construction from the one described with reference to Fig. 7, but the accumulator has a pressure space corresponding to that at 223 on Fig. 7 and so indicated. From said pressure space, Fig. 8, fluid is discharged to the manifold 242 through the delivery tube or duct 226. The accumulator spring 227 drives the piston 243 toward the end of the cylinder 244 to which the delivery tube 226 is attached. The piston 243, in the case of Fig. 8 does not require any check valve since fluid is introduced to the space 223 as through a tube or duct 245 leading from a hydraulic actuator, indicated generally at 246.

Said actuator may be arranged as a double ended piston 247 in a suitable double ended cylinder having duplicate discharge fluid retaining check valves at 248. The piston has a supply sump 255 from which fluid is drawn into the cylinder spaces at the ends of the piston near the end portion of each stroke, as through inlets 249. For reciprocating the piston a rack and gear mechanism is shown at 257, 258 operable from one side of the housing as by a handle 259 connected to the gear.

The mechanism 246 can be disposed anywhere in the cockpit or operator space of the craft served and the sump is provided with a filler extension 260 having a readily removable closure cap 261.

Fluid supplied from the accumulator space 223 to the manifold 242 is rendered operative to supply the plunger cylinders of the cam actuating plungers 150', 151' and 152' selectively simply by manipulation of the desired keys as by the fingers of one hand disposed adjacent and grasping the valve body 222 forming part of the control column and of suitable proportions so that the pilot or operator can continue to control flight through the medium of the column while his hand is in propeller control position.

As shown on Fig. 8 the valve plunger 250' has been forced to the right by the key 150'' causing communication of the valve bore 250 of said plunger (adjacent manifold 242) with a space 265 within said bore, and formed by a long neck on the valve plunger, which space 265 is open at all times to communicate with a lateral discharge passage supplying a duct 150³ leading to the actuator cylinder of plunger 150'. Communication of the manifold 242 with the space 265, in the illustrated position of the valve plunger 250', is made possible by reason of the provision of a short neck at 266 on the plunger which, through suitable cross passages in the plunger, communicates with a central bore of the plunger. The central bore communicates with the space 265 through other cross passages as will be apparent.

The key 150'' is maintained in depressed or valve opening position as long as required for the desired amount of pitch adjustment. The key 150'' preferably controls the propeller for decreased pitch and when the desired amount of decrease has been attained the pilot releases the key 150'' whereupon the duct 150³ is then communicated with a return manifold 267 formed in the body and intersecting the three valve plunger bores thereof. Said manifold 267 discharges into a return line corresponding in function to the tube or duct 228 of Fig. 7 and so marked on Fig. 8. Said duct 228 of Fig. 8 empties into the supply sump 255 of the actuator mechanism 246 preferably at the supply pipe 260 of said mechanism.

The other control valves (plungers 251' and 252') are substantially identical with the one just described and the manifold and passage arrangement thereof serves the valves in the same manner. However, since the key 152" and its control valve plunger is for operating the pitch limit release stop mechanism 110 (see Figs. 4 and 7) it is desirable that some means be provided in order to prevent accidental manipulation of the key 152" or to make manipulation of said key a matter of conscious effort on part of the pilot or operator.

With that in view an abutment or latch mechanism designated 270 (Figs. 7 and 10) is provided on the body 222 in such position that said latch would not ordinarily be encountered by any portion of the hand of the pilot or operator. The latch mechanism includes a lever 271 secured as by a pivot screw 272 inserted into the body 222 at the left side of said body as faced by the pilot. A nose portion 273 of the lever 271 is normally held in position to block operation of the key 152" by reason of a spring 274 recessed into the body and bearing outwardly against the rearwardly extending arm of the lever 271. When the body 222 is grasped (e. g.) by the left hand of the operator or pilot, the palm of that hand is poised over the lever 271 but normally in spaced relation to it. When at any time, for example, the pilot would have occasion to control the propeller for reverse pitch, the control column will be close to the body of the operator so that the palm of said left hand will be still farther spaced from the latch operating lever 271, such being the usual position of the control column in landing an airplane. If the pilot ordinarily holds the control column in his right hand then it would always require conscious effort in order for him to reach around the valve body 22 the necessary distance in order for him to depress the latch release lever 271.

For effecting an emergency control manipulation for reverse pitch, the pilot first operates the latch 271 to release the key 152", then depresses said key in order to cause the latch block 117 of the latch mechanism 110 on the propeller to be raised out of the indentation 115 of the master or power gear 41, and, as soon as that has occurred, then depression of the key 150" will, through the piston element 150' and the pump and valve mechanism of the hermetically sealed hydraulic system of the propeller actuated thereby, cause the servomotor to move toward reverse pitch position as indicated for example on Fig. 7.

For feathering which is also an emergency operation the pilot would first depress the key 152" and then the key 151". As a matter of fact the two keys in each instance for reverse pitch or feathering can be depressed simultaneously and the desired respective operations will occur in proper order.

Referring further to the actual construction of the valve mechanism in the valve body 222 it may be noted that each of the keys is individually pressed forwardly as by suitable springs 276 reacting rearwardly against the valve body 222 and that the keys are maintained in position against rotary dislocation or riding on each other by guide dowels 277, the forwardly projecting ends of which are adapted to enter parallel complementary semi-cylindrical recesses 278 in the keys. The finger-fitting form of the keys is further brought out by Fig. 10. The keys may be secured to the stems of the plungers as by cross pins 279.

Rearward closure caps for the plunger bores 250 to 252 are provided as at 280 in threaded counterbores as clearly shown and the plungers are maintained in their normal positions against excessive forward movement by the heads of cap screws 281 which close the central bores of respective plungers. Said heads are received in cavities 282 of the caps 280 and abut the bottoms of the counterbores in which the caps are supported.

In making the necessary connections of the tubes 226, 228 and 150³ etc. to the control valve system, the group comprising tubes 150³ etc., generally indicated at 285 on Fig. 7, are provided with suitable high pressure flexible connections at 286 near the base of the control column and the metal tubes connected therewith lead into the column and finally out of an upper portion of it as through grommets 287 (one shown in Fig. 9) for connection with the fittings 254. The tubes 226 and 228 are similarly provided with high pressure flexible connectors at 288 near the base of the column and the upper ends of the metal tubes connected therewith communicate with the respective bores in the body 222 constituting the supply and discharge manifolds 242 and 267 respectively as at high pressure fittings 289 and 290, Fig. 9.

Referring further to Fig. 7 it will be observed that in order for the annular cams 250 and 252 (diagrammatically shown) to be in their operating positions in which shown, with respect to the pump-valve units 20 and 21 (cam 150) and pump valve unit 22 (cam 152), the keys 150" and 152" would both be in depressed position. Only the key 151" controlling cam 151 would be in the released position illustrated.

I claim:

1. In a variable pitch propeller, pitch changing mechanism rotatable with the propeller for varying pitch of a blade thereof in opposite directions through a normal and abnormal range, a latch mechanism on the propeller connected with said mechanism and normally blocking operation thereof beyond the normal range, a plurality of actuating members adjacent but non-rotatable with the propeller for causing respectively desired operations of the pitch changing mechanism and for releasing the latch mechanism, and a series of control devices respective to the actuating members and located remotely of the propeller and side by side for operation by a single hand of an operator, said control devices being operatively connected respectively to the actuating members.

2. In a variable pitch propeller, a hub, a blade mounted on the hub for pitch adjustment, a reversible hydraulic motor having oppositely acting pressure chambers and a piston means connected with the blade, a duplex pump and valve system on the hub for positively operating the motor in opposite directions and including units each of which comprises a reciprocating pump plunger and a reciprocating plunger type valve, and a plurality of selectively positionable actuating members, each member operating to actuate a pump of one unit and a valve of another unit substantially simultaneously during successive revolutions of the propeller to force fluid to one chamber of the motor while venting fluid from the other.

3. In a variable pitch propeller, a hub and a blade turnably mounted thereon for pitch adjustment in opposite directions, a reversible hydraulic motor including a piston means connected to the blade and having opposed pressure chambers, a source of hydraulic fluid on the hub, two reciprocating pumps connected with said source and respective chambers, two exhaust valves connected with respective chambers and arranged to return fluid therefrom to said source, the pump of each chamber being paired with the valve of the other chamber, said pairs each having operating parts moved in approximately the same circular path by and during rotation of the hub, the paths of the two pairs of operating parts being different, and non-rotatable actuators for respective pairs of operating parts, each actuator being selectively movable from a non-actuating position to an actuating position such that it engages and disengages its respective pair of operating parts during rotation of the hub.

GORDON W. HARDY.

REFERENCES CITED

The following references are of record in the file of this patent:

UNITED STATES PATENTS

| Number | Name | Date |
|---|---|---|
| Re. 22,034 | Hoover | Feb. 24, 1942 |
| 1,372,944 | Constantinesio | Mar. 29, 1921 |
| 1,810,159 | Carol | June 16, 1931 |
| 1,894,048 | Lilley | Jan. 10, 1933 |
| 2,002,712 | Patriarche | May 28, 1935 |
| 2,023,785 | Hoover | Dec. 10, 1935 |
| 2,149,388 | Caldwell | Mar. 7, 1939 |
| 2,166,653 | Austin | July 18, 1939 |
| 2,229,058 | Dicks | Jan. 21, 1941 |
| 2,248,590 | Smith | July 8, 1941 |
| 2,257,126 | Rindfleisch | Sept. 30, 1941 |
| 2,290,196 | Martin et al. | July 21, 1942 |
| 2,307,101 | Blanchard et al. | Jan. 5, 1943 |
| 2,307,102 | Blanchard et al. | Jan. 5, 1943 |
| 2,313,301 | Ratie et al. | Mar. 9, 1943 |
| 2,320,195 | Rindfleisch | May 25, 1943 |
| 2,343,382 | Martin | Mar. 7, 1944 |
| 2,346,979 | Lilley | Apr. 18, 1944 |
| 2,347,104 | Hoover | Apr. 18, 1944 |
| 2,353,773 | Unterberg | July 18, 1944 |
| 2,355,039 | Eves | Aug. 1, 1944 |
| 2,412,923 | Stevenson | Dec. 17, 1946 |

FOREIGN PATENTS

| Number | Country | Date |
|---|---|---|
| 147,228 | Switzerland | Aug. 17, 1931 |
| 559,361 | Great Britain | Feb. 16, 1944 |
| 635,992 | Germany | Aug. 30, 1934 |
| 703,319 | Germany | Feb. 6, 1941 |
| 782,129 | France | May 28, 1935 |
| 796,083 | France | Mar. 28, 1936 |
| 826,196 | France | Mar. 24, 1938 |